Sept. 5, 1950 M. H. HINGERTY, JR 2,521,368
MARINE THRUST BEARING ASSEMBLY
Filed Jan. 20, 1947 2 Sheets-Sheet 1

Inventor
Mills H. Hingerty, Jr.
By Leech & Radue
Attorneys

Sept. 5, 1950 M. H. HINGERTY, JR 2,521,368
MARINE THRUST BEARING ASSEMBLY
Filed Jan. 20, 1947 2 Sheets-Sheet 2
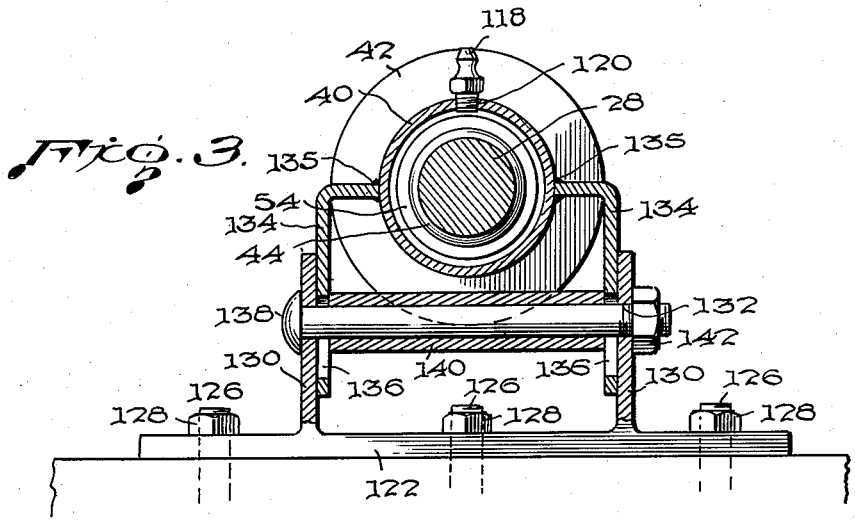
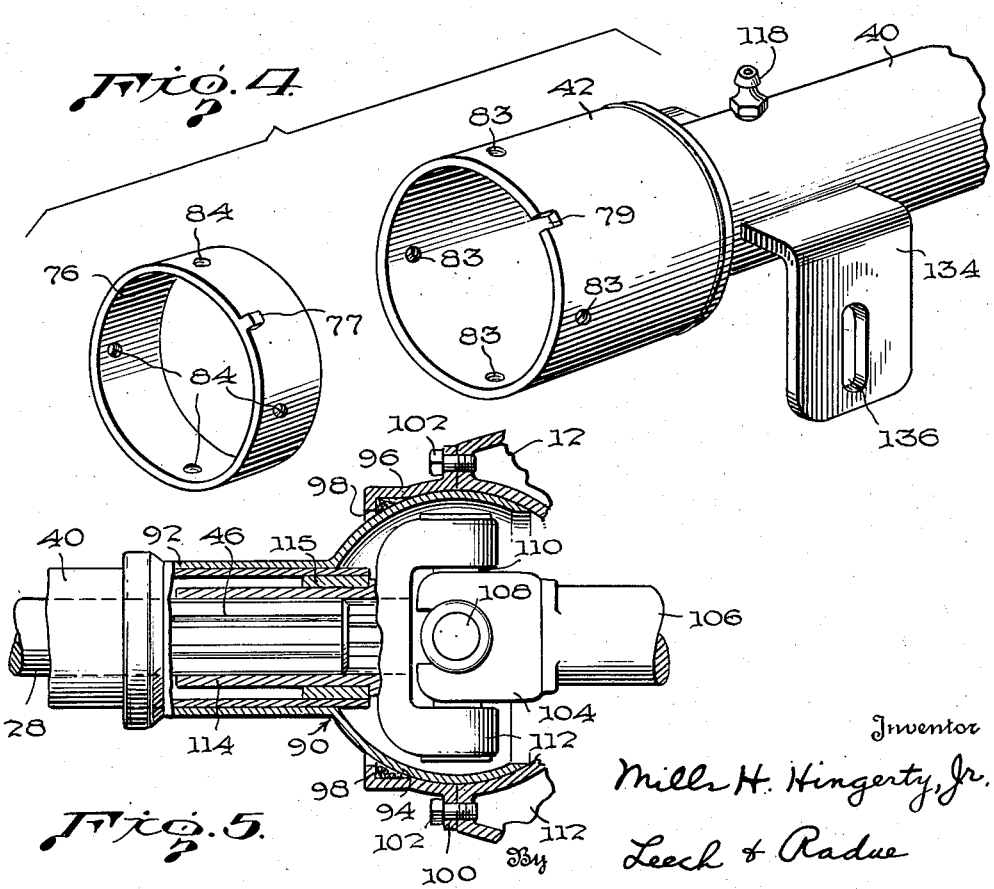
Inventor
Mills H. Hingerty, Jr.
By Leech & Radue
Attorneys Patented Sept. 5, 1950

2,521,368

UNITED STATES PATENT OFFICE 2,521,368

MARINE THRUST BEARING ASSEMBLY

Mills H. Hingerty, Jr., Eclipse, Va.

Application January 20, 1947, Serial No. 723,001

10 Claims. (Cl. 115—34)

The present invention relates generally to the art of marine propulsion.

More particularly this invention pertains to an improved power transmission assembly for marine propulsion apparatus especially adapted to be interposed in driving and thrust absorbing relation between the engine drive shaft and the propeller shaft of a boat.

An important object of the present invention is to provide a power transmission assembly of the general type described which is particularly well suited to use with various types of standard automotive engines in adapting the latter for marine propulsion.

Another object of the invention is to provide a power transmission assembly for marine propulsion apparatus capable of being easily adjusted to secure proper shaft alignment.

A further object of the invention is to provide a power transmission assembly of the type described embodying an improved oppositely effective thrust bearing having substantially all of its moving parts enclosed within a unitary housing adapted to be maintained substantially completely full of lubricant at all times.

An additional object of the invention is to provide a power transmission assembly for marine propulsion apparatus of the type described employing relatively few working parts which may be inexpensively manufactured and assembled into a durable integral unit requiring a minimum of maintenance attention in use.

The above as well as other and further objects and advantages of the invention together with a better understanding of the precise nature thereof will become more readily apparent to one skilled in the art from a consideration of the following detailed description taken in conjunction with the accompanying drawings illustrating a preferred embodiment thereof in which like numerals refer to corresponding parts throughout the several views and wherein:

Fig. 3 is a transverse cross-sectional view through the power transmission assembly and mounting bracket taken substantially along the line 3—3 of Fig. 2;

Fig. 4 is an exploded perspective view illustrating selected portions of the housing constituting an important part of the improved power transmission assembly in accordance with the present invention; and Fig. 5 is a side elevational view in partial cross section illustrating the forward portion of the power transmission assembly of Fig. 1 in greater detail and to an enlarged scale.

Figure 1:
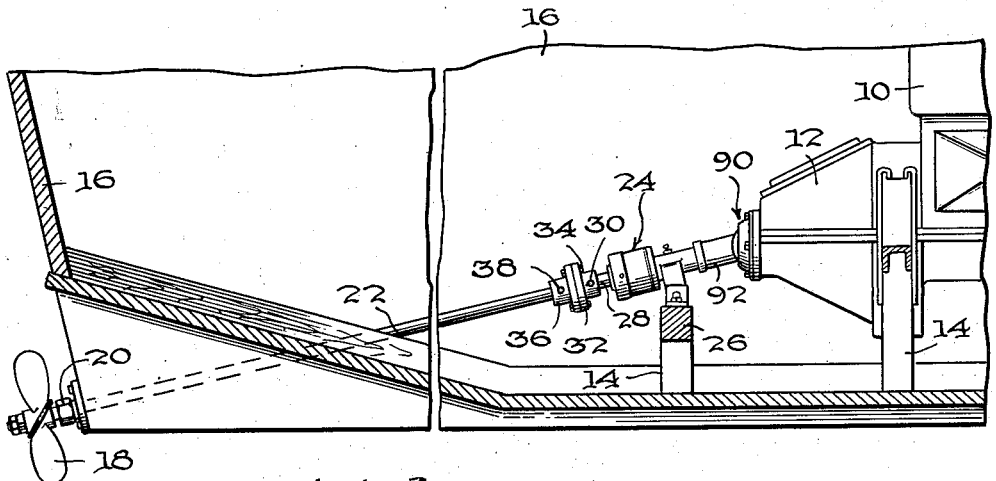
Fig. 1 is a fragmentary longitudinal cross-sectional view through a boat illustrating the general arrangement of a marine propulsion apparatus in accordance with the present invention and showing the manner of mounting my improved power transmission assembly therein.

Referring now specifically and in detail to the various figures of the drawings and in particular to Fig. 1 thereof, there is illustrated a preferred form of marine propulsion apparatus in accordance with the present invention which is seen to comprise a conventional automotive power plant 10 having the usual clutch or reduction gear casing 12 mounted upon transverse beams 14 forming a part of the bottom framework of a boat 16. A conventional screw propeller 18 is mounted exteriorly of the boat 16 in any convenient manner as by means of the usual outboard bearing 20 and is connected to the usual propeller shaft 22 which extends forwardly into the boat to a point adjacent the drive shaft 106 (Fig. 5) of the power plant 10. My improved power transmission assembly is designated generally in Fig. 1 by reference numeral 24 and is shown as being mounted upon a transverse block 26 secured in any convenient manner to one of the transverse beams 14. A portion of a stub shaft 28 constituting a part of the power transmission assembly 24 extends rearwardly from the latter and as shown in Fig. 1, is suitably attached as by means of a pin 30 to a flanged collar 32 adapted to be secured as by means of a plurality of bolts 34 extending about its periphery to the mating flange of a similar collar 36 similarly attached as by means of a pin 38 to the forward end of the propeller shaft 22.

Figure 2:
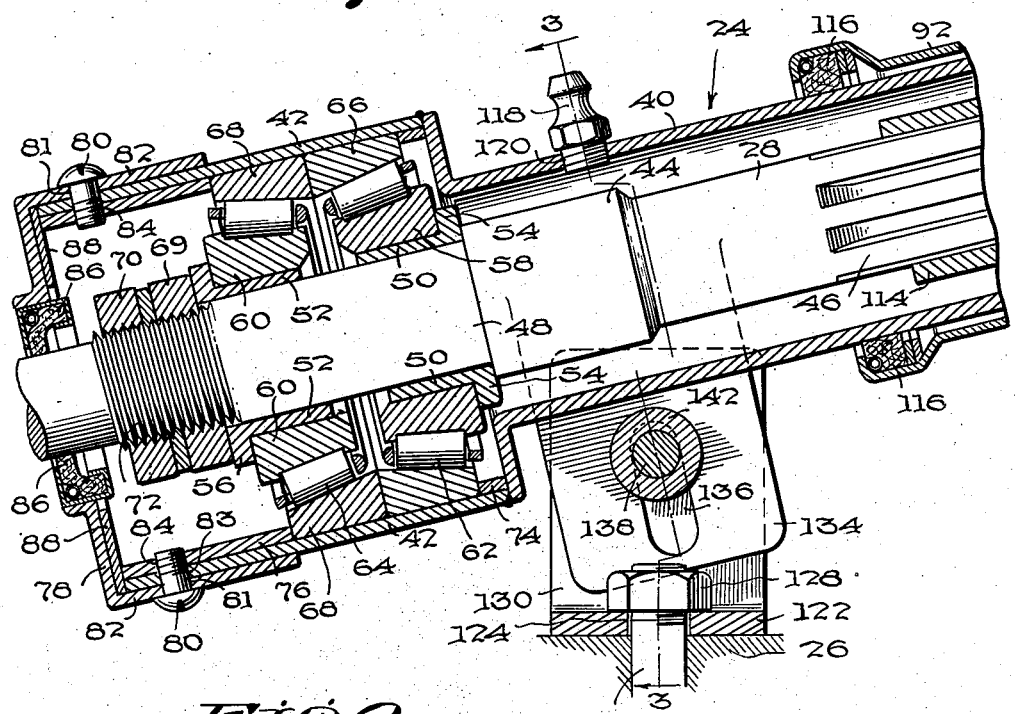
Fig. 2 is a longitudinal cross-sectional view through a portion of the power transmission assembly of Fig. 1 to an enlarged scale.

As shown particularly in Fig. 2, my improved power transmission assembly comprises a generally hollow cylindrical housing 40 having an enlarged portion 42 of similar shape at its rearward end. The stub shaft 28 is rotatably mounted within the housing 40 and is provided with an enlarged central abutment 44 and a splined front end 46 adapted to be adjustably connected to the drive shaft 106 of the power plant 10 in a manner to be hereinafter described. The portion 48 of the stub shaft 28 lying to the rear of the enlarged abutment 44 extends through a pair of collars 50 and 52 having oppositely disposed flanges 54 and 56, respectively, at their opposite ends. The collars 50—52 are adapted to be received within the inner races 58 and 60 of a pair of oppositely effective thrust bearings having oppositely inclined tapered rollers 62 and 64, respectively, disposed between the inner races 58 and 60 and a pair of outer races 66 and 68.

It will be noted in Fig. 2 that the inner races 58 and 60 of the bearings are retained between the flanges 54 and 56 of the collars 50 and 52 by means of a pair of locknuts designated by reference numerals 69 and 70 in engagement with a threaded portion 72 of the stub shaft 28. The outer races 66 and 68 are suitably dimensioned about their outer peripheries to be snugly received within the enlarged portion 42 of the housing and are secured against axial or longitudinal movement relative to the housing by means of a pair of spacer bushings 74 and 76. The spacer bushings 74—76 are also suitably dimensioned to be snugly received within the interior of the enlarged portion 42 of the housing and, as shown in Fig. 4, the outer bushing 76 is provided with a radially projecting lug 77 adapted to be received within a suitably dimensioned notch 79 formed in the end of the enlarged portion 42 of the housing for locating the bushing 76 relative to the latter and for preventing relative rotation therebetween.

The assembly described above is preferably secured in place by means of a cap 78 having a depending cylindrical wall 82 which surrounds and substantially closes the rearward end of the housing and is provided with a plurality of bolts 80 extending through suitable apertures 81 formed in the depending wall 82, similar apertures 83 formed in the enlarged portion 42 of the housing, and engaged within suitably threaded apertures 84 formed in the spacer bushing 76. It will also be noted in Fig. 2 that the cap 78 is provided with a central aperture for the passage of the stub shaft 28 therethrough having a conventional packing 86 in sealing engagement with the latter. A gasket 88 of any suitable material is also provided at the inner face of the cap 78 to serve as a seal against the outer rims of the spacer bushing 76 and the enlarged portion 42 of the housing.

Referring now particularly to Fig. 5, is will be noted that the right-hand or forward end of the housing 40 is provided with an adapter designated generally by reference numeral 90 and including a sleeve 92 surrounding the housing 40 and a generally hemispherical cover having an inner portion 94 and an outer portion 96 closely surrounding the inner portion. Suitable packing 98 is provided between the members 94 and 96 and the outer member 96 is provided with a flange 100 adapted to be secured to a similarly dimensioned portion of the gear casing 12 as by means of a plurality of bolts 102. Within the hemispherical cover portion of the adapter 90, I have provided a universal joint of any suitable type preferably comprising a driving yoke or clevis 104 directly connected to the drive shaft 106 of the power plant and secured as by means of the usual pivot pins 108 and 110 to a similar yoke or clevis 112. The clevis 112 is provided with a hollow tubular portion 114 mounted in a bearing 115 in the end of the housing 40 and is formed with a plurality of internal splines therein slidably engageable with the splined end 46 of the stub shaft 28. Although the sleeve 92 closely surrounds the forward end of the housing 40, I have provided additional sealing means therebetween preferably in the form of a spring-pressed packing 116 as shown in detail in Fig. 2.

From the description thus far, it will be noted that I have provided for considerable adjustment between the various elements of the assembly. For example, the longitudinally slidable connection between the splined end 46 of the stub shaft 28 and the similarly splined sleeve 114 permits considerable relative adjustment of the shaft elements both in assembly and in operation. Furthermore, the adapter 90 permits longitudinal adjustment between the housing 40 and the sleeve 92 and at the same time provides for a large degree of misalignment between the drive shaft 106 and the stub shaft 28 by means of the relatively movable cover elements 94 and 96.

As shown in Figs. 2, 3, and 4, a lubrication fitting 118 preferably of the pressure feed type is suitably attached as by means of threads 120 to the housing 40. As has been described above the rearward portion of the housing 40 is closed by means of the cap 78 having the packing 86 and the sealing gasket 88 associated therewith, whereas the forward end of the housing 40 is sealed by means of the packings 98 and 116, and the bearing 115. It will now be apparent that since the housing 40 is substantially completely closed by the various packing devices specified, it may be maintained substantially completely full of lubricant admitted under pressure through the fitting 118. Furthermore, since the end of the casing 12 is in practically all cases open to the lubricating system of the particular power plant employed, it will also be apparent that the universal joint will be properly lubricated so that the single fitting 118 is sufficient to adequately provide lubricant for all moving parts of the entire assembly.

An important feature of my invention comprises the adjustable mounting bracket for the improved power transmission as illustrated in Figs. 2, 3, and 4. As shown in these views, this mounting bracket includes a generally rectangular base 122 having a plurality of apertures 124 therein adapted to receive and be held in place on the block 26 by a plurality of stud bolts 126 and associated nuts 128. A pair of substantially parallel arms or supports 130 provided with apertures 132 therein extend upwardly from the base 122 and are preferably formed integrally therewith as a metal casting or the like. The housing 40 is provided with a pair of depending generally angle-shaped arms 134 secured thereto as by welding or the like as indicated at 135 and having closed elongated slots 136 therein adapted to lie between the supports 130 adjacent the apertures 132 in the latter. The arms 134 are adapted to be adjustably secured to the supports 130 by suitable means such as a through bolt 138 provided with a bushing 140 and secured in place by means of a nut 142. This adjustable mounting bracket affords a large measure of flexibility in the initial installation of my improved power transmission assembly and permits any necessary adjustments from time to time to take care of possible vertical shaft misalignment.

It will be apparent from the foregoing that by the present invention, I have provided a compact power transmission assembly particularly well adapted for use in conjunction with marine propulsion apparatus and embodying a relatively few working parts of a simple and inexpensive nature. In all marine propulsion systems it is highly desirable that the working parts be protected so far as possible from the corrosive or other detrimental action of the elements to which they are continually subjected and it is to be particularly noted that the completely enclosed and lubricated housing of my improved power transmission assembly embodies this feature to a noteworthy degree. It is likewise true that boats are seldom produced to exacting dimensions upon a mass basis so that the various features of adjustability provided by my improved power transmission assembly render it particularly suitable for a variety of installations involving various types of power plants. It will also be noted that I have provided all of the above as well as additional features and advantages in an integral unitary assembly which may be easily handled and transported.

Although I have chosen to illustrate and describe in detail only a single preferred embodiment of this invention, it is to be understood that numerous changes can be made in size, materials, and arrangement of parts without departing from the principles of the invention as set forth in the appended claims.

Having thus described my invention, what I claim as novel and desire to secure by Letters Patent of the United States is:

1. A power transmission assembly for marine propulsion apparatus comprising, a housing, a shaft in said housing, a thrust bearing operatively interposed between said shaft and said housing for transmitting thrust to the latter, an adjustable mounting bracket for said assembly including a pair of arms attached to said housing and depending downwardly therefrom, a base having a pair of arms extending upwardly therefrom, one pair of arms having elongated slots and the other pair of arms having apertures, and means extending through said slots and said apertures for fastening the pairs of arms in adjusted relation.

2. A power transmission assembly for marine propulsion apparatus comprising, a substantially closed housing, a shaft in said housing, a thrust bearing operatively interposed between said shaft and said housing for transmitting thrust to the latter, an adjustable mounting bracket for said assembly including a pair of arms attached to said housing and having elongated slots therein, a base having a pair of apertured supports extending therefrom, and means extending through said slots and said apertured supports for fastening the latter to said arms, and a lubrication fitting on said housing whereby the latter may be maintained substantially completely full of lubricant.

3. In a boat provided with a propeller shaft and a power plant having a drive shaft, a power transmission assembly for interconnecting said drive shaft and said propeller shaft comprising, a housing, a stub shaft in said housing adapted to be connected at its rear end to said propeller shaft and adapted to be connected at its front end to said drive shaft, a thrust bearing on said stub shaft within said housing, means for holding said bearing against longitudinal movement relative to said stub shaft, a pair of spacer bushings at opposite sides of said bearing for restricting longitudinal movement of the latter within said housing, a cap attached to and closing the rear end of said housing including a central aperture for the passage of said stub shaft therethrough, and a bracket for adjustably mounting said housing on said boat including a base having a pair of apertured supports extending upwardly therefrom, a pair of arms depending from said housing and having elongated slots therein, and means extending through the apertures in said supports and said slots for fastening said arms to said supports.

4. In a boat provided with a propeller shaft and a power plant having a drive shaft, a power transmission assembly for interconnecting said drive shaft and said propeller shaft comprising, a hollow cylindrical housing having an enlarged portion at its rearward end, a stub shaft in said housing adapted to be connected at its rear end to said propeller shaft and having a splined front end for longitudinally adjustable connection to said drive shaft, a pair of oppositely effective thrust bearings on said stub shaft within the enlarged portion of said housing, means for holding said bearings against longitudinal movement relative to said stub shaft, a pair of spacer bushings at opposite sides of said bearings for restricting longitudinal movement of the latter within said housing, a cap attached to and closing the rear end of said housing including a central aperture for the passage of said stub shaft therethrough, and a bracket for adjustably mounting said housing on said boat including a base having a pair of apertured supports extending upwardly therefrom, a pair of arms depending from said housing and having elongated slots therein, and means extending through the apertures in said supports and said slots for fastening said arms to said supports.

5. In a boat provided with a propeller shaft and a power plant having a drive shaft, a power transmission assembly for interconnecting said drive shaft and said propeller shaft comprising, a hollow cylindrical housing having an enlarged portion at its rearward end, a universal joint engageable with said drive shaft, a stub shaft in said housing adapted to be connected at its rear end to said propeller shaft and having a splined front end for longitudinally adjustable connection to said universal joint, a pair of oppositely effective thrust bearings on said stub shaft within the enlarged portion of said housing, means for holding said bearings against longitudinal movement relative to said stub shaft, a pair of spacer bushings at opposite sides of said bearings for restricting longitudinal movement of the latter within said housing, a cap attached to and closing the rear end of said housing including a central aperture for the passage of said stub shaft therethrough, and a bracket for adjustably mounting said housing on said boat including a base having a pair of apertured supports extending upwardly therefrom, a pair of arms depending from said housing and having elongated slots therein, and means extending through the apertures in said supports and said slots for fastening said arms to said supports.

6. In a boat provided with a propeller shaft and a power plant having a drive shaft, a power transmission assembly for interconnecting said drive shaft and said propeller shaft comprising, a hollow cylindrical housing having an enlarged portion at its rearward end, an adapter at the forward end of said housing movably engageable with said power plant, a universal joint within said adapter engageable with said drive shaft, a stub shaft in said housing adapted to be connected at its rear end to said propeller shaft and having a splined front end for longitudinally adjustable connection to said universal joint, a pair of oppositely effective thrust bearings on said stub shaft within the enlarged portion of said housing, means for holding said bearings against longitudinal movement relative to said stub shaft, a pair of spacer bushings at opposite sides of said bearings for restricting longitudinal movement of the latter within said housing, a cap attached to and closing the rear end of said housing including a central aperture for the passage of said stub shaft therethrough, and a bracket for adjustably mounting said housing on said boat including a base having a pair of apertured supports extending upwardly therefrom, a pair of arms depending from said housing and having closed elongated slots therein, and bolt means extending through the apertures in said supports and said slots for fastening said arms to said supports.

7. In a boat provided with a propeller shaft and an automotive power plant having a drive shaft, a power transmission assembly operatively interconnecting said drive shaft and said propeller shaft comprising, a hollow cylindrical housing having an enlarged portion at its rearward end, means for adjustably mounting said housing in said boat, an adapter at the forward end of said housing movably attached to said power plant, a universal joint within said adapter connected to said drive shaft, a stub shaft in said housing connected at its rear end to said propeller shaft and having a splined front end adjustably connected to said universal joint, a pair of oppositely effective thrust bearings on said stub shaft within the enlarged portion of said housing, means for holding said bearings against longitudinal movement relative to said stub shaft, a pair of spacer bushings at opposite sides of said bearings for restricting longitudinal movement of the latter within said housing, a cap attached to and closing the rear end of said housing including a central aperture for passage of said stub shaft, and a lubrication fitting on said housing whereby the latter may be maintained substantially completely full of lubricant.

8. In a boat provided with a propeller shaft and an automotive power plant having a drive shaft, a power transmission assembly operatively interconnecting said drive shaft and said propeller shaft comprising, a hollow cylindrical housing having an enlarged portion at its rearward end, means for adjustably mounting said housing in said boat, an adapter at the forward end of said housing movably attached to said power plant, a universal joint within said adapter connected to said drive shaft, a stub shaft in said housing connected at its rear end to said propeller shaft and having an enlarged central abutment thereon and a splined front end adjustably connected to said universal joint, a pair of oppositely effective thrust bearings on said stub shaft within the enlarged portion of said housing, a locknut in threaded engagement with said stub shaft for holding said bearings against said abutment, a pair of spacer bushings at opposite sides of said bearings for restricting longitudinal movement of the latter within said housing, a cap attached to and closing the rear end of said housing including a central aperture for passage of said stub shaft, and a lubrication fitting on said housing whereby the latter may be maintained substantially completely full of lubricant.

9. In a boat provided with a propeller shaft and an automotive power plant having a drive shaft, a power transmission assembly operatively interconnecting said drive shaft and said propeller shaft comprising, a hollow cylindrical housing having an enlarged portion at its rearward end, means for adjustably mounting said housing in said boat, an adapter at the forward end of said housing including a sleeve surrounding the latter and a hemispherical cover movably attached to said power plant, a universal joint within said cover connected to said drive shaft, a stub shaft in said housing connected at its rear end to said propeller shaft and having an enlarged central abutment thereon and a splined front end adjustably connected to said universal joint, a pair of oppositely inclined tapered roller bearings on said stub shaft within the enlarged portion of said housing, a locknut in threaded engagement with said stub shaft for holding said bearings against said abutment, a pair of spacer bushings at opposite sides of said bearings for restricting longitudinal movement of the latter within said housing, a cap attached to and closing the rear end of said housing including a central aperture for passage of said stub shaft, and a lubrication fitting on said housing whereby the latter may be maintained substantially completely full of lubricant.

10. Marine propulsion apparatus comprising, an automotive power plant adapted to be mounted in a boat and having a drive shaft extending rearwardly therefrom, a propeller mounted exteriorly of said boat having a propeller shaft attached thereto and extending forwardly into said boat adjacent to said drive shaft, and a power transmission assembly operatively interconnecting said drive shaft and said propeller shaft comprising a generally hollow cylindrical housing having an enlarged portion at its rearward end, means for adjustably mounting said housing in said boat, an adapter at the forward end of said housing including a sleeve surrounding the latter and a hemispherical cover movably attached to said power plant, a universal joint within said cover connected to said drive shaft, a stub shaft in said housing connected at its rear end to said propeller shaft and having an enlarged central abutment thereon and a splined front end adjustably connected to said universal joint, a pair of oppositely inclined tapered roller bearings on said stub shaft within the enlarged portion of said housing, a locknut in threaded engagement with said stub shaft for holding said bearings against said abutment, a pair of spacer bushings at opposite sides of said bearings for restricting longitudinal movement of the latter within said housing, a cap attached to and closing the rear end of said housing including a central aperture and a packing in sealing engagement with said stub shaft, and a lubrication fitting on said housing whereby the latter may be maintained substantially completely full of lubricant.

MILLS H. HINGERTY, Jr.

REFERENCES CITED

The following references are of record in the file of this patent:

UNITED STATES PATENTS

| Number | Name | Date |
| --- | --- | --- |
| 1,515,881 | Pontius | Nov. 18, 1924 |
| 1,736,972 | Hutchinson | Nov. 26, 1929 |